United States Patent
Boussaguet et al.

(10) Patent No.: US 7,909,717 B2
(45) Date of Patent: Mar. 22, 2011

(54) TENSIONING ROLLER DEVICE OR WINDER

(75) Inventors: Jérôme Boussaguet, Nieuwegein (NL); Romuald Lescorail, Tours (FR)

(73) Assignee: Aktiebolaget SKF, Gothenburg (SE)

( * ) Notice: Subject to any disclaimer, the term of this patent is extended or adjusted under 35 U.S.C. 154(b) by 46 days.

(21) Appl. No.: 11/974,912

(22) Filed: Oct. 16, 2007

(65) Prior Publication Data
US 2008/0132365 A1 Jun. 5, 2008

(30) Foreign Application Priority Data
Oct. 20, 2006 (FR) ...................................... 06 54418

(51) Int. Cl.
*F16H 7/08* (2006.01)
(52) U.S. Cl. ........................................................ 474/136
(58) Field of Classification Search .................. 474/101, 474/111, 133, 136; 384/489; 301/5.7
See application file for complete search history.

(56) References Cited

U.S. PATENT DOCUMENTS

| | | | |
|---|---|---|---|
| 2,742,663 A * | 4/1956 | Meadows | 16/40 |
| 4,474,562 A * | 10/1984 | Heurich | 474/133 |
| 5,711,618 A * | 1/1998 | Waskiewicz | 384/489 |
| 6,241,257 B1 | 6/2001 | Hauck et al. | |
| 6,428,213 B1 * | 8/2002 | Parejko et al. | 384/489 |
| 7,011,317 B1 * | 3/2006 | Hicks et al. | 280/33.991 |
| 2003/0004023 A1* | 1/2003 | Hotta | 474/101 |
| 2004/0120620 A1 | 6/2004 | Landrieve | |
| 2006/0188190 A1 | 8/2006 | Schmidl et al. | |

FOREIGN PATENT DOCUMENTS
GB 2313417 11/1997

OTHER PUBLICATIONS
Search Report for French Patent Application FR 0654418.

* cited by examiner

*Primary Examiner* — Robert A Siconolfi
*Assistant Examiner* — Anna Momper
(74) *Attorney, Agent, or Firm* — Meyertons, Hood, Kivlin, Kowert & Goetzel, P.C.; Eric B. Meyertons

(57) ABSTRACT

Tensioning roller device including a non-rotating central part around which is rotatably mounted a pulley-forming rotating part, and a protective cap mounted on one end of the central part and extending radially outwards so as to form a narrow passage and/or a baffle with the rotating part, the cap including means for axial fastening to the non-rotating central part and means for angular fastening to the non-rotating central part.

9 Claims, 3 Drawing Sheets

TENSIONING ROLLER DEVICE OR WINDER

BACKGROUND OF THE INVENTION

1. Field of the Invention

The present invention relates to the field of tensioning rollers or winders used particularly for adjusting and maintaining the tension and/or orientation of the strands of a belt, for example in a motor vehicle internal combustion engine.

Such rollers are used, for example, with timing belts or belts for driving accessories.

2. Description of the Relevant Art

Tensioning rollers generally include a pulley rotatably mounted on a non-rotating pin or shaft that can be displaced radially so that the pulley is caused to apply the appropriate tension to the belt with which it is in contact. The radial displacement of the pin or shaft can be adjusted by a screw mechanism. In order to reinforce the protection and sealing of the roller, typical tensioning rollers include a cap mounted on the rotating part of the pulley by snap-fitting it into an annular channel formed in the pulley. However, if it is then required to orient the shaft to fasten it to the support, this operation can prove very difficult owing to the small available space generally present between the roller and the support and owing to the lack of visual references for the angular indexing of the shaft.

SUMMARY OF THE INVENTION

In the light of the above, it is therefore desirable to overcome the aforementioned disadvantages.

Described herein are rollers including a pulley rotatably mounted on a non-rotating pin or shaft that includes a protective cap arranged on the opposite side to the roller-accommodating support in order to reinforce the protection and sealing of the roller.

The invention is intended to allow an orientation of the shaft, independently of the available distance between the pulley and the support.

The tensioning roller device or winder includes a non-rotating central part around which is rotatably mounted a pulley-forming rotating part, and a protective cap mounted on one end of the central part and extending radially outwards so as to form a narrow passage and/or a baffle with the rotating part. The cap includes means for axial fastening to the non-rotating central part and means for angular fastening to the non-rotating central part. The cap, secured axially and circumferentially to the non-rotating central part, can thus be used to orient the central part, for example a shaft, in order to fasten it to a support.

In one embodiment, the cap includes an axial fastening portion provided with an inwardly projecting rib co-operating with a groove formed in the central part. The groove can be formed in a cylindrical axial surface of the central part. The rib can be circumferentially continuous or discontinuous. The rib can be arranged at the end of the axial portion. The groove can be arranged at the end of the central part.

In one embodiment, the axial fastening portion is divided into a plurality of fingers provided with hooks co-operating with the said groove.

In one embodiment, the cap includes an axial peg co-operating with a housing formed in the central part. The peg can be parallel to the geometric axis of the device. The peg, thus being non-concentric with the central part, allows an angular indexing of the cap and the central part, in co-operation with the axial fastening portion. Provision can also be made for a plurality of pegs, for example two or three, projecting into a corresponding number of housings formed in the central part. The housing can be formed at an axial end of the central part, for example starting from a radial surface.

In one embodiment, the cap includes a gripping member for handling the device by way of an axial end opposed to an end for fastening the central part. The device can thus be handled by the cap, be it manually by an operator, or automatically by a machine.

In one embodiment, the cap includes an orientation marker allowing the central part to be oriented blind in order to mount it on a support. It is thus possible to establish correspondence between the orientation marker of the cap, which remains visible when mounting the device on a support, and the surfaces of the central part that have to be oriented for the mounting on the support.

In one embodiment, the central part includes a one-piece shaft provided with at least one inner raceway. The rotating part can include an outer race provided with a corresponding outer raceway.

In another embodiment, the central part includes a shaft and an inner bearing race provided with at least one raceway on its outer surface.

The rotating part can be of one-piece type, with a pulley provided with a raceway over its bore, or else produced as a number of pieces, with a pulley part designed to co-operate with a belt and an outer bearing race arranged in the bore of the pulley and fastened to this pulley by press fitting, shape correspondence, overmolding, etc.

In one embodiment, a radial hole can be formed in the shaft on the side opposed to the cap. The hole can be threaded and co-operate with an adjustment screw. The hole can be a through hole.

By virtue of the invention, the tensioning roller is suitably protected against the ingress of foreign elements through the presence of the non-rotating cap forming a narrow passage and/or a baffle with at least one surface of the rotating part. The cap is fastened axially, radially and angularly to the non-rotating part. The cap can be fastened by snap-fitting hooks into a recess in the central part, thus providing axial and radial fixing. Rotational fixing can be provided by a stud, which is off-centered with respect to the geometric axis of the central part.

BRIEF DESCRIPTION OF THE DRAWINGS

The present invention will be better understood on studying the detailed description of an embodiment given by way of non-limiting example and illustrated by the appended drawings, in which.

Figure 1:
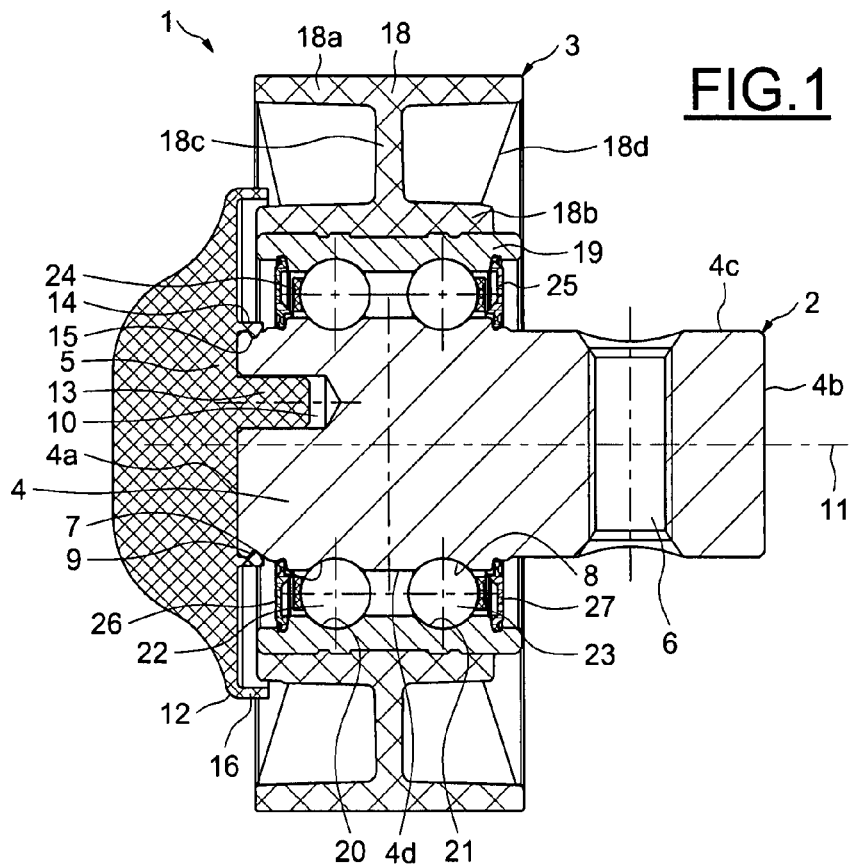
FIG. 1 is a view in axial section of a device according to one aspect of the invention.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

As can be seen in FIG. 1, the tensioning roller device 1 includes a non-rotating part 2 and a rotating part 3. The non-rotating part 2 includes a shaft 4 and a protective cap 5 fastened to the shaft. The shaft 4 includes a radial end surface 4a on the side towards the cap 5 and a radial end surface 4b on the opposite side, a small-diameter axial outer surface 4c on the side towards the radial surface 4b, and a large-diameter axial outer surface 4d. A radial through hole 6 is formed in the shaft 4 starting from the small-diameter axial surface 4c. Starting from the large-diameter axial surface 4d are formed two inner raceways 7 and 8. An annular groove 9 is formed in the outer surface of the shaft 4, in the vicinity of the radial end surface 4a. An axial hole 10 is formed in the shaft 4 starting from the radial surface 4a. The hole 10 can be a blind hole and is parallel to the geometric axis 11 of the device, represented by dot-dash lines. In other words, the hole 10 is off-centered with respect to the geometric axis of the shaft 4.

The cap 5 includes a circular part 12, in the form of a disc, from which there extends a peg 13 projecting into the hole 10, the circular part 12 being in contact with the radial surface 4a of the shaft 4. Also extending from the circular part 12 is an axial fastening part 14 provided with a radial rib 15 projecting inwardly into the groove 9 in the shaft 4. The rib 15 can be circumferentially continuous or discontinuous, that is to say with segments occupying a defined angular sector. The axial fastening part 14 can be annular, taking the form of a rim projecting axially with respect to the annular part 12, or else taking the form of a plurality of fingers, each provided with a hook-forming rib portion 15 and separated from one another.

The cap 5 additionally includes an annular axial rim 16 formed around its periphery and projecting axially in the direction of the radial surface 4b and co-operating with the rotating part 3 to form a narrow passage.

Figure 2:
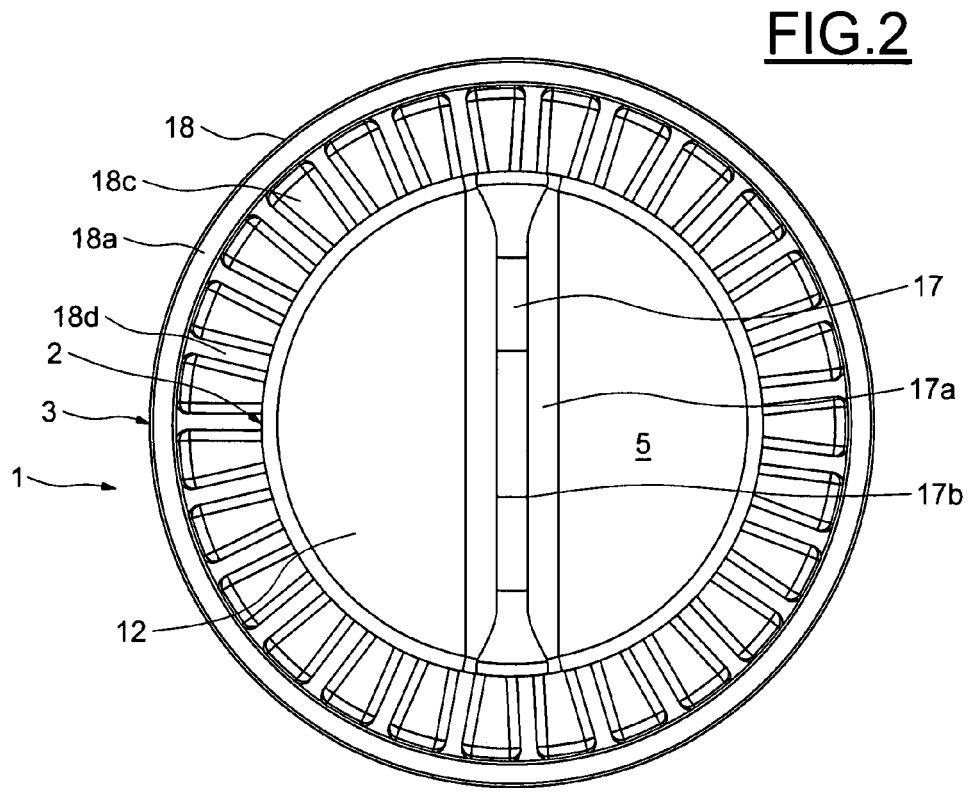
FIG. 2 is a front elevation of the device shown in FIG. 1.

The cap 5 further includes a gripping and orientation member 17 in the form of an axial protuberance with respect to the circular part 12. The said member 17 includes a flared foot 17a of progressively reducing thickness going away from the annular part 12, and a part of substantially constant thickness 17b in the form of a bar which is represented in FIG. 2 in the vertical position and which can easily be grabbed by hand owing to its radially and axially elongated shape.

Figure 3:
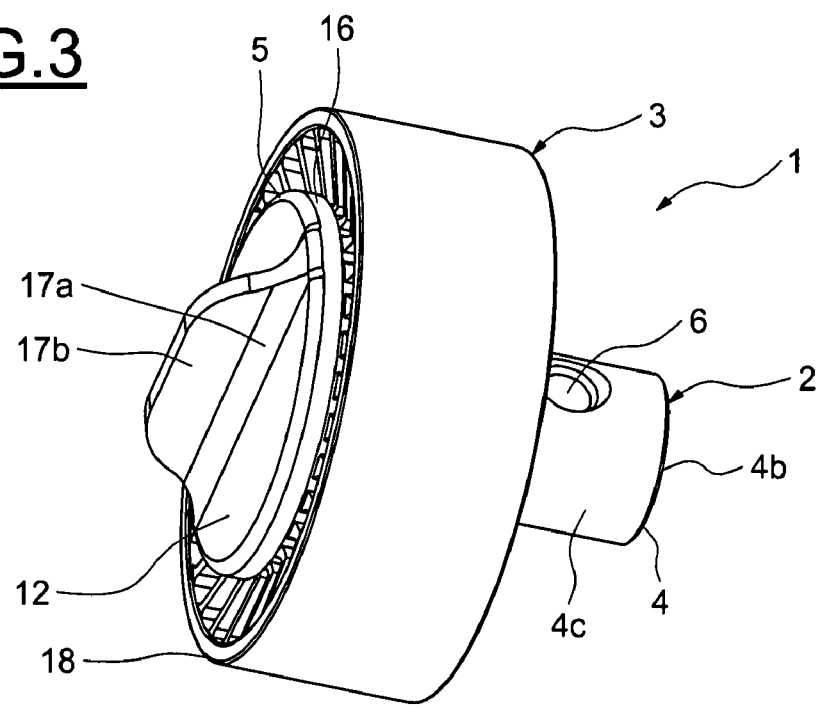
FIG. 3 is a perspective view of the device shown in FIG. 1.

The rotating part 3 includes a pulley 18 and an outer bearing race 19. The annular pulley 18 has an I-shaped axial cross section with an outer axial portion 18a designed to be in contact with a belt, a small-diameter axial portion 18b whose bore is in contact with the outer race 19, and a radial portion 18c providing the connection between the two axial portions 18a and 18b. The pulley 18 can be made of synthetic material overmolded onto the outer race 19. As can be seen in FIGS. 2 and 3, radial ribs 18d in the form of spokes and perpendicular to the annular radial portion 18c are arranged between the axial portions 18a and 18b of the pulley 18 so as to increase its radial rigidity.

The outer race 19 includes a bore in which are formed two outer raceways 20 and 21 for rolling elements 22 and 23, here arranged in two rows. Of course, the rolling elements can be arranged in a single row. The rolling elements 22 and 23 are balls here. The raceways 7 and 8 formed in the shaft 4, and 20 and 21 formed in the bore of the outer race 19, have a toroidal shape. The rolling elements 22 and 23 arranged between the outer and inner raceways are maintained at a defined circumferential spacing by cages 24 and 25. Flanges or seals 26 and 27 are fastened in an annular groove formed in the outer race 19 and provide frictional sealing, or sealing by way of a narrow passage, with an appropriate surface of the shaft 4. The seal 26 is arranged on the side towards the cap 5, in the vicinity of the groove 9 in the shaft 4. The seal 27 is arranged on the opposite side. On the side towards the cap 5, protection against ingress of foreign elements is provided, on the one hand, by the narrow passage formed between the annular rim 16 of the cap 5 and the outer surface of the small-diameter axial portion 18b of the pulley 18 and, on the other hand, by the seal or sealing flange 26.

The cap 5 can be mounted on the shaft 4 by a simple axial movement, this taking place after the shaft 4 and the rotating part 3 have been assembled. Snap-fitting of the hooks 15 into the annular groove 9 ensures axial and radial retention of the cap 5 with respect to the shaft 4 to form the non-rotating central part 2. The peg 13, which is off-center with respect to the shaft 4, ensures that the cap 5 is prevented from rotating with respect to the shaft 4.

Figure 4:
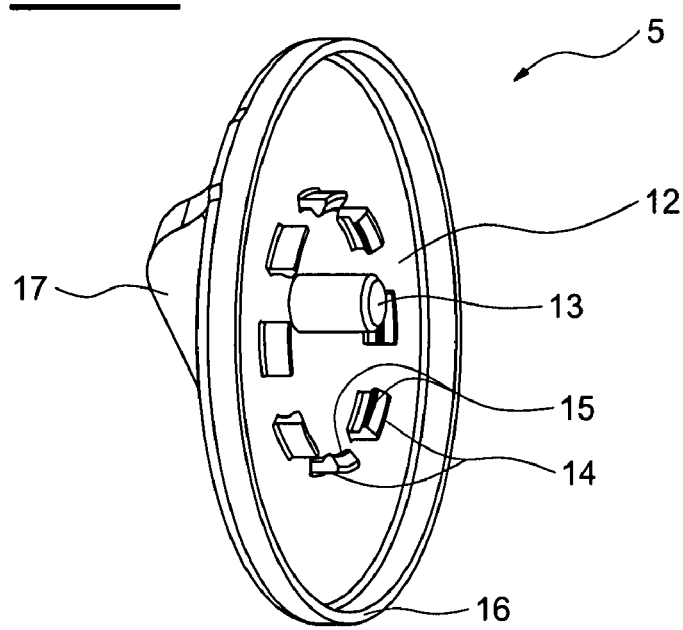
FIG. 4 is a perspective view of the cap.

As illustrated in FIG. 4, the axial fastening part 14 takes the form of a plurality of fingers that are separated angularly from one another. Of course, it is also possible to provide a circular axial part 14 and, if appropriate, hooks 15 that are likewise circular.

Figure 5:
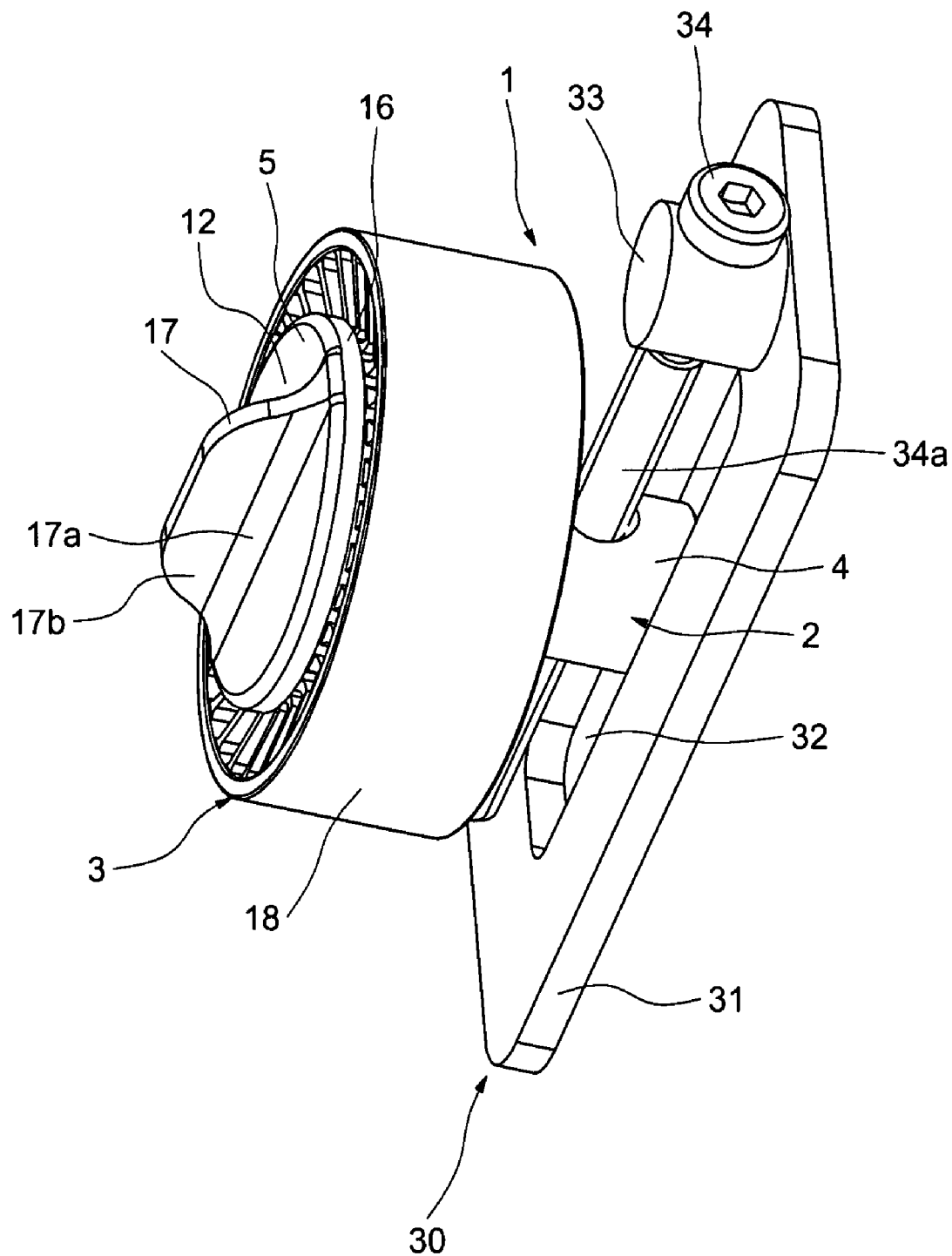
FIG. 5 is a perspective view of the device mounted on a support.

As illustrated in FIG. 5, the device 1 is mounted on a support 30 including a mounting plate 31 provided with a slot 32, a stud 33 which is fastened to the mounting plate 31 beyond a longitudinal end of the slot 32 and which projects with respect to the said mounting plate, and a screw 34 rotatably mounted in the stud 33, parallel to the slot 32 and having a threaded part 34a which passes into the hole 6 in the shaft 4. The stud 33 allows an axial connection between the screw 34 and the mounting plate 31 while permitting the free rotation of the said screw 34 inside the said stud 33. The hole 6 is internally threaded. The free end of the shaft 4 opposed to the cap 5 projects into the slot 32, the outer surface 4c being able to slide against the walls of the slot 32, thus preventing the device 1 from pivoting during the rotation of the screw 34. The rotation of the screw 34 thus makes it possible to move the device 1 upwards or downwards with respect to the slot 32 and to the mounting plate 31, thus offering a translational adjustment.

The mounting plate 31 is generally mounted on the engine block of a vehicle before fitting the device 1 on the support 30.

Mounting the device 1 on the support 30 requires orienting the hole 6 with the geometric axes of the hole 6 and the screw 34 being brought into correspondence. In this embodiment, the gripping member 17 thus also performs an orientation function by forming a marker which has a defined angular position with respect to the geometric axis of the hole 6, for example by being substantially parallel or else substantially perpendicular. In the embodiment shown in FIG. 5, the gripping member 17 is substantially parallel to the geometric axis of the hole 6. Since the cap 5 is secured angularly to the shaft 4, it is possible for the device 1 with a suitably oriented hole 6 to be guided "blind" by an operator in an easy and intuitive manner.

In other embodiments, the gripping member can take the form of an axial peg and the orientation marker can take the form of an arrow applied to or formed in the circular part 12 of the cap 5 with dissociated gripping and orientation functions.

By virtue of the invention, mounting the device on its support is considerably simplified, the risk of error is very greatly reduced and the risk of wasting time during mounting is also reduced to very low levels. Furthermore, sealing of the roller is considerably reinforced by the mutual co-operation of the cap and the pulley to form a narrow passage and/or a baffle intended to reduce the risk of ingress of polluting elements.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A tensioning roller device or winder comprising:
    a non-rotating central journal part provided with a threaded radial through hole enabling the journal part to be mounted on a radial support element;
    a pulley-forming part rotatably mounted around the journal part by means of a bearing, and adapted to support a belt on its outer circumference; and
    a protective cap comprising a central circular part covering an axial end of the central journal part, and a circumferential shield part extending radially further than the journal part, up to the pulley-forming part, so as to define a narrow passage and/or a chicane between the pulley-forming part and the cap, thus inhibiting ingress of polluting elements into the bearing,
        the protective cap comprising means for axial fastening to the axial end of the central journal part, and means for angular, non-rotative fastening to the journal part, so that that the whole device can be handled, and the central part can be angularly oriented around its axis, so as to be mounted onto the radial support element, by means of holding only the cap,
    wherein the means for non-rotative fastening comprises an axial peg, the axial peg extending from the central circular part and co-operating along a surface generated only by axial lines parallel to the rotation axis of the pulley-forming part, with an axial hole formed into an end surface, perpendicular to the axis of rotation of the pulley, of the central journal part.

2. The device or winder of claim 1, wherein the cap comprises an axial fastening portion provided with an inwardly projecting rib co-operating with a groove formed in the central part.

3. The device or winder of claim 2, wherein the groove is arranged at the axial end of the central part.

4. The device or winder of claim 2, wherein the axial fastening portion is divided into a plurality of fingers provided with hooks co-operating with the groove.

5. The device or winder of claim 1, wherein the cap comprises a gripping member permitting to handle the device, the gripping member being located axially at an opposite end of the cap then the means fastening the central part.

6. The device or winder of claim 1, wherein the cap comprises an angular orientation marker allowing an operator to orient the device around an axis and mount the central part onto the radial support element without seeing the radial hole.

7. The device or winder of claim 1, wherein the central part comprises a one-piece shaft provided with at least one raceway on an outer surface.

8. The device or winder of claim 1, wherein the central part comprises a shaft and an inner bearing ring provided with at least one raceway on an outer surface.

9. The device or winder of claim 1, wherein the axial peg is non-concentric with the central part.

\* \* \* \* \*